US012790123B2

(12) United States Patent
Laible

(10) Patent No.: US 12,790,123 B2
(45) Date of Patent: Nov. 10, 2026

(54) STACKING COLUMN FOR A MOTOR VEHICLE PANORAMIC ROOF

(71) Applicant: MTS Maschinenbau GmbH, Mengen (DE)

(72) Inventor: Eckhard Laible, Leinfelden-Schlechtenmühle (DE)

(73) Assignee: MTS Maschinenbau GmbH, Mengen (DE)

(*) Notice: Subject to any disclaimer, the term of this patent is extended or adjusted under 35 U.S.C. 154(b) by 0 days.

(21) Appl. No.: 19/046,927

(22) Filed: Feb. 6, 2025

(65) Prior Publication Data

US 2025/0256923 A1 Aug. 14, 2025

(30) Foreign Application Priority Data

Feb. 9, 2024 (DE) ..................... 10 2024 103 723.7

(51) Int. Cl.
*B65G 1/14* (2006.01)

(52) U.S. Cl.
CPC ..................................... *B65G 1/14* (2013.01)

(58) Field of Classification Search
CPC ........... B62B 3/005; B62B 3/04; B62B 5/061; B62B 2202/00; B62B 3/10; B62B 5/049; B62B 3/02; B65G 1/14
See application file for complete search history.

(56) References Cited

U.S. PATENT DOCUMENTS 3,534,863 A * 10/1970 Howard .................. A47F 7/163 211/47
3,570,679 A * 3/1971 Edson ..................... A47F 7/163 108/1
4,688,681 A * 8/1987 Bergeron .................. A47F 7/08 211/195
5,988,777 A * 11/1999 Schoeller ................. B65G 1/14 312/190
7,350,649 B1 * 4/2008 Martens .................. A47F 7/144 211/187
8,496,127 B2 7/2013 Strobel
9,022,371 B2 * 5/2015 Seghezzi .................. B65G 1/14 248/304
10,280,002 B2 * 5/2019 Giachero ................. B65G 1/14
(Continued)

FOREIGN PATENT DOCUMENTS

DE 4020864 A1 1/1992
DE 29808971 U1 9/1998
(Continued)

OTHER PUBLICATIONS

Extended European Search Report dated Jun. 6, 2025, issued in corresponding application EP 25156427.4.
(Continued)

*Primary Examiner* — Ko H Chan
(74) *Attorney, Agent, or Firm* — Bachman & LaPointe, P.C.

(57) ABSTRACT

The invention relates to a stacking column for a motor vehicle panoramic roof, with a pawl (1), wherein the pawl (1) has a first side flange (2) and a second side flange (3) bent at one end, wherein each of the side flanges (2, 3) has a first bolt passage (4) and a second bolt passage (5), wherein the pawl (1) has a top side (6) and a bottom side (7), and wherein the pawl has a foam body (11) at another end.

9 Claims, 3 Drawing Sheets

(56) References Cited

U.S. PATENT DOCUMENTS

| | | | | |
|---|---|---|---|---|
| 2007/0152544 | A1* | 7/2007 | Strobel | B65G 1/14 312/9.58 |
| 2012/0055841 | A1* | 3/2012 | Flener | B60J 10/34 206/586 |
| 2012/0262826 | A1* | 10/2012 | Gillard | H05K 7/1495 29/829 |
| 2017/0291336 | A1* | 10/2017 | Hashimoto | B29C 45/0025 |
| 2017/0305051 | A1* | 10/2017 | Hashimoto | B29C 45/1704 |
| 2021/0061570 | A1* | 3/2021 | Laible | B65G 1/14 |
| 2022/0144550 | A1* | 5/2022 | Maloney | A47B 81/007 |
| 2025/0128747 | A1* | 4/2025 | Robinson | B62B 3/005 |
| 2025/0313409 | A1* | 10/2025 | Jensen | B62B 3/005 |

FOREIGN PATENT DOCUMENTS

| | | | |
|---|---|---|---|
| DE | 202007013310 | U1 | 11/2007 |
| DE | 202013100674 | U1 | 4/2013 |
| DE | 202020104669 | U1 | 2/2021 |
| DE | 202021004013 | U1 | 5/2022 |
| DE | 102022102083 | A1 | 8/2023 |
| EP | 0464700 | B1 | 8/1994 |

OTHER PUBLICATIONS

Office Action dated Aug. 27, 2024, issued in corresponding application DE 10 2024 103 723.7.

* cited by examiner

STACKING COLUMN FOR A MOTOR VEHICLE PANORAMIC ROOF

TECHNICAL FIELD

The invention relates to a stacking column for a motor vehicle panoramic roof.

STATE OF THE ART

Such stacking columns are used, particularly in the automotive industry, to temporarily store sheet metal parts that come from a forming system and need to be transported for further processing. This is merely an example, as the stored goods can be arbitrary. Today, there are also stacking columns for batteries and other very heavy goods. In recent years, there has increasingly been a need to store large, bulky, heavy, and very sensitive panoramic roofs in stacking columns.

These include vertical stacking columns as well as horizontal or inclined ones, all of which are intended to fall under the scope of the present invention.

For loading such stacking columns, pawls have proven to be very practical. These pawls are connected in such a way that they move from a resting position to a working position during the filling of the stacking column or a frame equipped with these stacking columns. This process usually begins by placing a workpiece on the lowest pawl, which thereby rotates the lowest pawl into the working position. By this rotation, the lowest pawl moves the next pawl into a ready position to receive the next load. By receiving the next load, the following pawl is again rotated into the ready position. Outside the ready position and the working position, the pawls remain in a resting position, for example, between two side flanges of the stacking column.

Such a stacking column is described, for example, in DE 20 2020 104 669 U1.

Regarding the storage of motor vehicle panoramic roofs, the issue arises that these roofs have very sensitive seals running along their entire edge length.

From the prior art, reference is made to DE 298 08 971 U1, which suggests for such cases that pawl levers made of plastic, steel, or aluminum should be used. Pawl levers made of steel or aluminum are suggested to include plastic as a shock-absorbing material. DE 298 08 971 U1 provides no further indication of other possible shock-absorbing materials.

DE 20 2007 013 310 U1 also only describes plastic as the material for the pawls of stacking columns or as the material for the individual parts of the pawls.

Finally, reference is made to DE 20 2013 100 674 U1, which describes a protective element and a spacer element made of plastic, rubber, or silicone. A disadvantage of plastic is its frequent breakage. Rubber lacks the flexibility needed for the transport of motor vehicle panoramic roofs, and silicone does not have sufficient strength.

SUMMARY OF THE INVENTION

The objective of the present invention is to provide a stacking column that is particularly suitable for receiving and storing, for example, heavy and sensitive motor vehicle panoramic roofs.

The solution to the objective is achieved through the features disclosed herein.

The stacking column according to the invention consists of a U-shaped body, in the channel of which multiple pawls are pivotally arranged on top of one another. These pawls can be brought into a ready position, a working position, and a resting position by means of various mechanisms.

The stacking column described here is specifically designed for a motor vehicle panoramic roof. The core focus of the invention lies in the pawl, where the pawl has a first side flange and a second side flange bent at one end. Each of the side flanges has a first bolt passage and a second bolt passage. The pawl also has a top side and a bottom side.

The stored goods can, for example, be a motor vehicle panoramic roof. However, it is also possible for other flat and sensitive components to be considered as stored goods. The particular challenge with motor vehicle panoramic roofs is that they are bulky, sensitive, and, in some cases, heavy. To store motor vehicle panoramic roofs according to the invention, the pawl has a foam body at its other end.

The foam body can also be made of memory foam. Possible foam materials include memory foam in general, viscoelastic foam, memory foam, visco foam, visco gel foam, and others. Memory foam typically has very high density and viscosity. However, its main characteristic is the "shape memory": memory foam knows its original shape and returns to this form as soon as the load is removed.

For this purpose, the foam body is injection-molded onto the pawl, which facilitates manufacturing.

In another embodiment, the foam body can have an anti-slip surface. This, in particular with respect to motor vehicle panoramic roofs, ensures not only a gentle resting surface but also prevents unwanted movements.

The two side flanges are essentially bent at a right angle to the top side and/or the bottom side of the pawl, thereby achieving higher stiffness. Furthermore, functionalities such as mounting on linkage bolts or axle bolts can be more easily implemented in this way. For this purpose, as described above, the first bolt passage and the second bolt passage are provided. The linkage bolt, for example, passes through the two second bolt passages, and the axle bolt passes through the two first bolt passages.

The linkage bolt is necessary to move the pawl, for example, from the resting position to the ready position. The axle bolt merely serves to enable the swiveling of the pawl within the U-profile. The rotation of the pawl from a working position to a ready position and to a resting position or vice versa is well known from the prior art. Reference is made in particular to the document mentioned in the state of the art.

The return of the pawls to their respective starting position is preferably achieved by a simple force accumulator, such as a leg spring, which is threaded onto an axle bolt and rests against the pawl and the rear side of a U-shaped body.

Furthermore, the pawl has a strip at its other end, which is bent upward within the foam body. This provides the foam body with additional stability for absorbing forces and weights and ensures better retention of the foam body on the pawl.

In a variation of this, there can also be not only one strip but at least two strips bent upward within the foam body at the other end of the pawl. Between the two strips, a middle part continues along its entire length. This offers the additional advantage of greater flexibility while ensuring stronger retention of the foam body on the pawl.

Additionally, the foam body can have a continuous or interrupted chamfer along its length, with the chamfer positioned on the side facing away from the pawl and directed toward the bottom side. This has the advantage of preventing the foam body from jamming or unintentionally compressing when it comes into contact with the motor vehicle panoramic roof held underneath the pawl.

Protection is also claimed for the use of a foam, as described above, for pawls of a stacking column for storing motor vehicle panoramic roofs.

Additionally, protection is claimed for the method of manufacturing a pawl with a foam body for use in a stacking column for storing motor vehicle panoramic roofs by injection molding.

BRIEF DESCRIPTION OF THE DRAWINGS

Further advantages, features, and details of the invention emerge from the following description of preferred embodiments as well as from the drawings. These show in.

DETAILED DESCRIPTION

Figure 1:
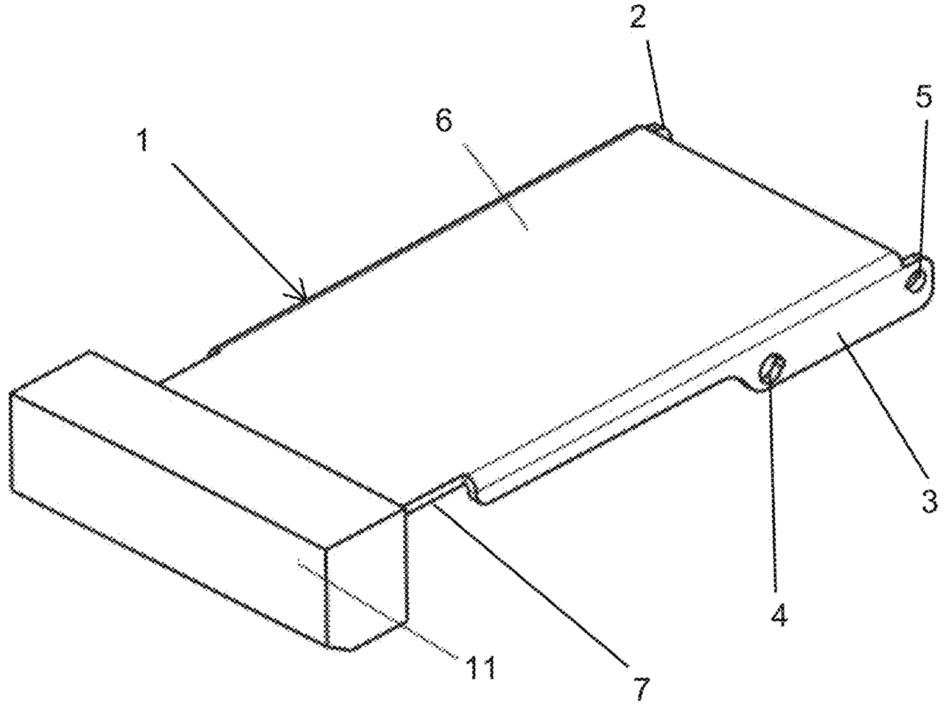
FIG. 1 a perspective view of a stacking column pawl 1.

In FIG. 1, a perspective view of a stacking column pawl 1 is shown. The stacking column pawl 1 features two bent side flanges 2 and 3, each of which includes a first bolt passage 4 and a second bolt passage 5.

The stacking column pawl 1 is inserted at its end into a U-shaped body not shown of a stacking column also not shown, wherein the second bolt passage 5 essentially defines one end of the stacking column pawl 1, and a foam body 11 encloses the other end.

The stacking column pawl 1 has two surfaces. These are a top side 6 and a bottom side 7. The two side flanges 2 and 3 are in this example of embodiment bent toward the bottom side 7.

The foam body 11 has in side view a first edge length a and a second edge length b.

Figure 2:
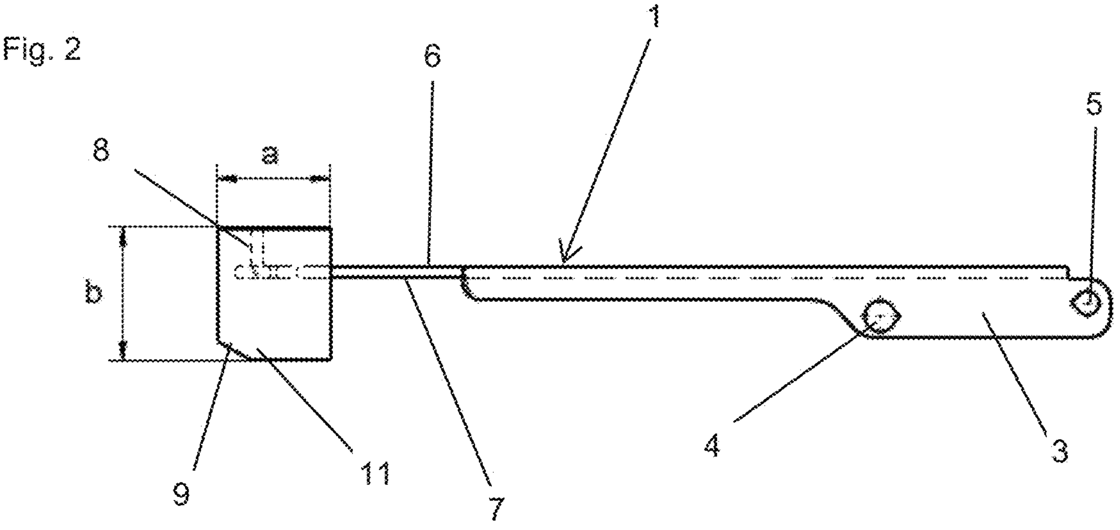
FIG. 2 a side view of the stacking column pawl 1 according to FIG. 1.

In the FIG. 2 are beside the already described features also within the foam body 11 shown dashed features present. Within the foam body 11 the stacking column pawl 1 at the other end forms a partly out of the remaining structure of the stacking column pawl 1 bent up strip 8. The strip 8 is at the other end of the stacking column pawl 1 bent toward the top side 6 or bent up. Here the second edge length b is chosen so that the bent up strip 8 is enclosed by the foam body 11. Enclosed means that the strip 8 does not protrude out of the foam body 11 but is completely integrated in the foam body 11.

Additionally it is well shown in the FIG. 2 that the foam body 11 on its side directed toward the bottom side 7 and away from the stacking column pawl 1 has a chamfer 9.

Figure 3:
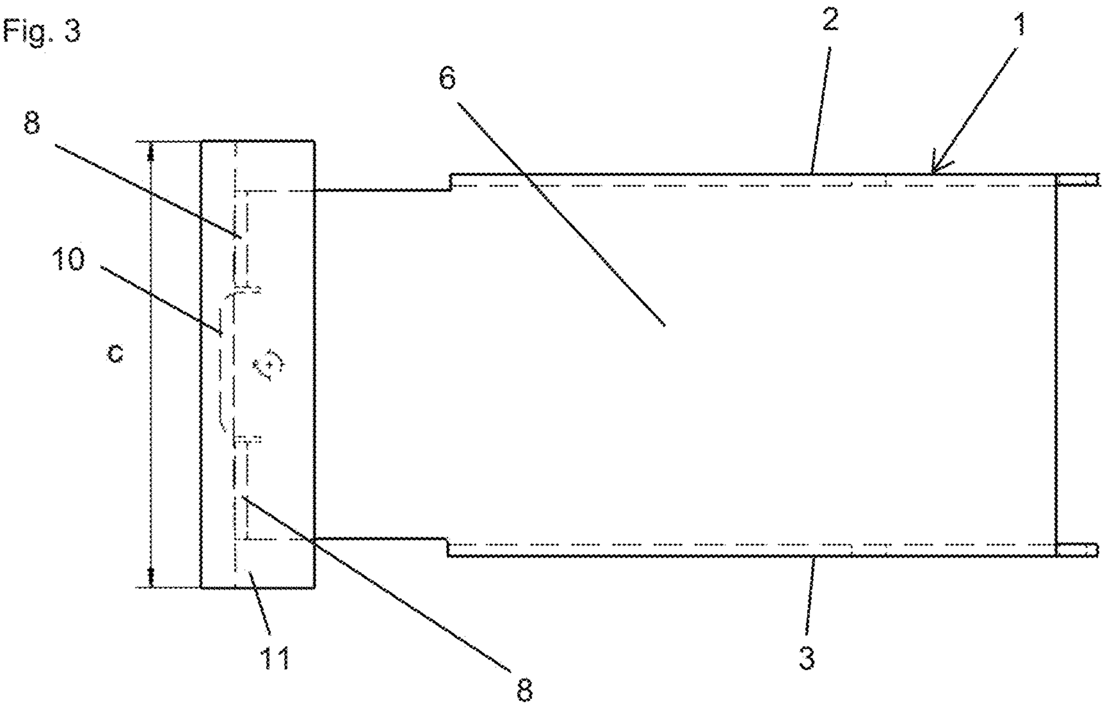
FIG. 3 a top view of the stacking column pawl 1 according to FIG. 1.

In the FIG. 3 it is additionally visible that in this example of embodiment within the foam body 11 two bent up strips 8 are present. Between the two strips 8 a middle part 10 is arranged. The middle part 10 defines together with the two bent up strips 8 the other end of the stacking column pawl 1.

Additionally it can be seen that a length c of the foam body 11 is chosen such that the foam body 11 extends beyond the total width of the stacking column pawl 1. As total width is defined the area from the first side flange 2 to the second side flange 3. At a right angle to the total width extends a total length of the stacking column pawl 1.

Figure 4:
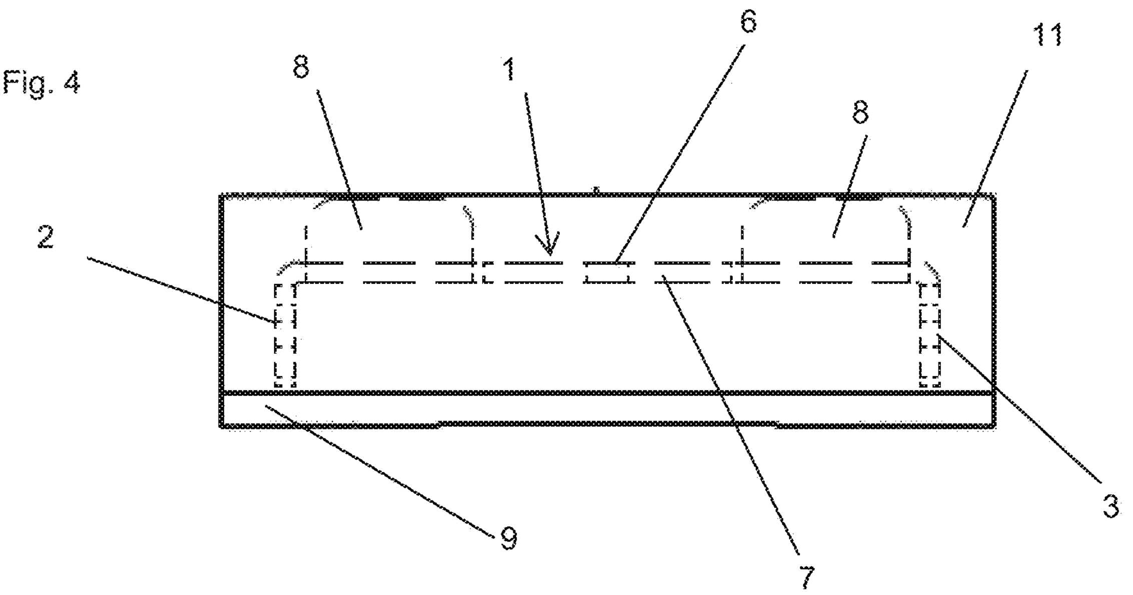
FIG. 4 a front view of the stacking column pawl 1 according to FIG. 1.

The FIG. 4 shows an enlarged front view of the stacking column pawl 1 from the previous FIGS. 1 to 3. To avoid repetitions, reference is made to the explanations for the previous figures. In particular, the descriptions of the features given for FIGS. 1 to 3 are also intended to apply to the FIG. 4, as the identical reference numerals have been used.

Figure 5:
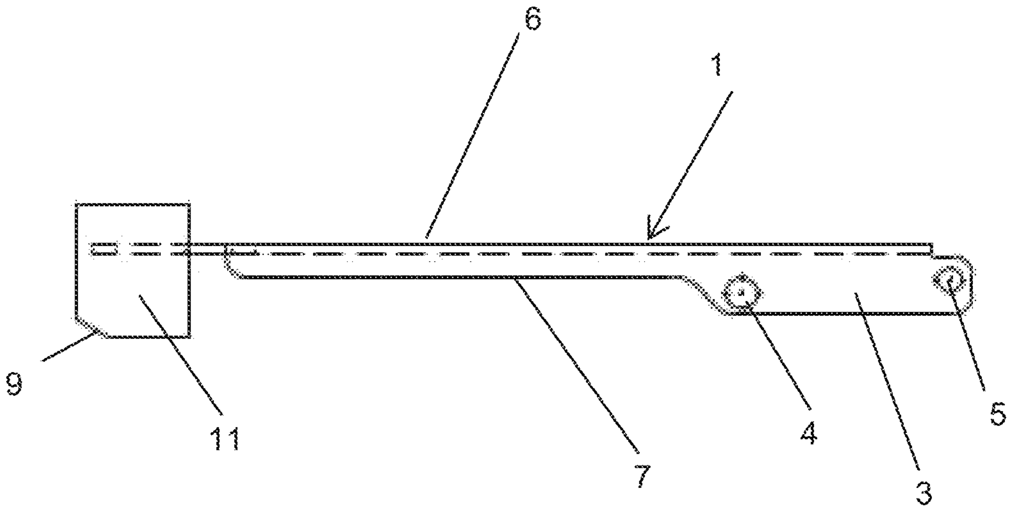
FIG. 5 a side view of another embodiment of the stacking column pawl 1.
Figure 6:
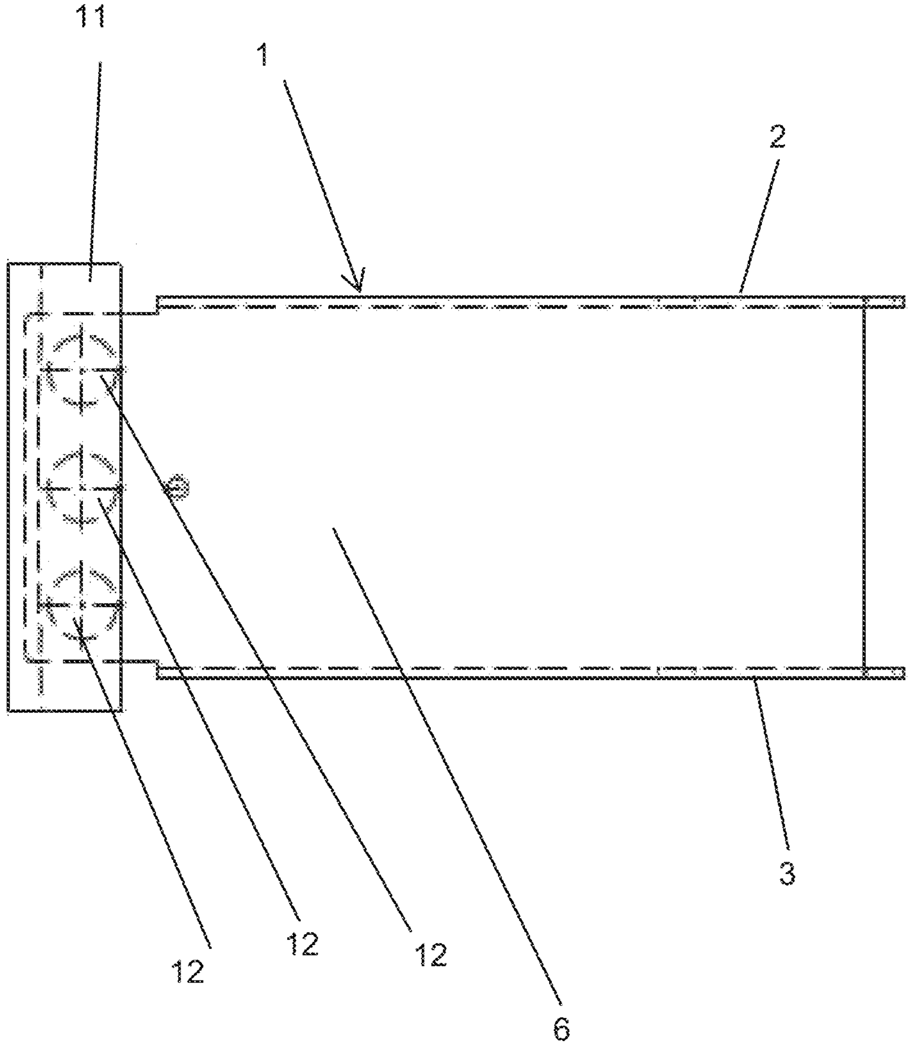
FIG. 6 a top view of the stacking column pawl according to FIG. 5.

The FIGS. 5 and 6 show another embodiment, which is identical to the FIGS. 1 to 4 with slight modifications. Therefore, the explanations of the individual features of the FIGS. 1 to 4 are also intended to apply to the FIGS. 5 and 6, especially when the identical reference numerals are used.

Unlike in the FIGS. 2 to 4, in the FIGS. 5 and 6 no strip 8 or middle part 10 are present. Instead, in the FIGS. 5 and 6, especially in the FIG. 6, shown and dashed represented are recesses 12, which serve during the manufacturing process to be flowed around by the still liquid material of the foam body 11 and in the hardened state to produce a connection that is also resistant to tensile stress between the foam body 11 and the pawl 1. For this purpose, the recesses 12 are located in an area of the pawl that is covered by the foam body 11 in its hardened state.

Unlike in the FIGS. 2 to 4, in the FIGS. 5 and 6 no strip 8 or middle part 10 are present. Instead, in the FIGS. 5 and 6, especially in the FIG. 6, recesses 12 are shown and represented with dashed lines, which serve during the manufacturing process to be flowed around by the still liquid material of the foam body 11 and in the hardened state to produce a connection that is also resistant to tensile stress between the foam body 11 and the pawl 1. For this purpose, the recesses 12 are located in an area of the pawl that is covered by the foam body 11 in its hardened state.

The functionality of the present invention is as follows:

As a rule, a plurality of stacking columns is arranged in a triangle or a rectangle, forming a receiving space for a load, in the present case particularly a heavy and sensitive load. The pawls engage in the clear space of this receiving area to hold the load between the stacking columns.

The invention of the stacking column pawl 1 described here is primarily intended for holding heavy and sensitive loads, such as panoramic roofs of motor vehicles.

These panoramic roofs typically feature a very sensitive surrounding seal that must under no circumstances be subjected to pressure, as this could otherwise lead to leaks at the affected spot that was subjected to pressure. Conventional pawls for stacking columns usually involve surface contact, which in the case of the described panoramic roofs, for example, leads to pressure marks on the surrounding seal.

Through the foam body 11, the typically convexly shaped panoramic roof can be supported softly and evenly. The same applies to other similarly sensitive goods. By adjusting the second edge length b in combination with the first edge length a and the length c, the dimensions of the respective panoramic roofs can be accommodated, so that the panoramic roof only makes contact in the glass area and not at the surrounding edge.

Similarly, the respective dimensions of the foam body 11 also allow a panoramic roof supported above or below to not only rest on the stacking column pawl 1 that supports the panoramic roof but also, with the side featuring the chamfer 9, to press against a panoramic roof stored underneath and minimize unwanted vibrations.

REFERENCE NUMERAL LIST

1 Pawl

2 First side flange

3 Second side flange
4 First bolt passage
5 Second bolt passage
6 Top side
7 Bottom side
8 Strip
9 Chamfer
10 Middle part
11 Foam body
12 Recess
a First edge length
b Second edge length
c Length

The invention claimed is:

1. A stacking column for a stored good, comprising a pawl (1), wherein the pawl (1) has a first side flange (2) and a second side flange (3) bent at one end, wherein each of the side flanges (2, 3) has a first bolt passage (4) and a second bolt passage (5), wherein the pawl (1) has a top side (6) and a bottom side (7), wherein the pawl (1) has a foam body (11) at another end, wherein a strip (8) is bent up within the foam body (11) at the other end of the pawl (1).

2. The stacking column according to claim 1, wherein the foam body (11) is injection-molded onto the pawl (1).

3. The stacking column according to claim 1, wherein the foam body (11) has an anti-slip surface.

4. The stacking column according to claim 1, wherein the foam body (11) consists of memory foam.

5. The stacking column according to claim 1, wherein the two side flanges (2, 3) are bent at a right angle to the top side (6) and/or to the bottom side (7) of the pawl (1).

6. The stacking column according to claim 1, wherein the pawl (1) has a recess (12) in the area of the foam body (11) for holding the foam body (11) on the pawl.

7. The stacking column according to claim 1, wherein two strips (8) are bent up within the foam body (11) at the other end of the pawl (1), wherein a middle part (10) continues in its full length between the two strips (8).

8. The stacking column according to claim 1, wherein the foam body (11) has a continuous or interrupted chamfer (9) over a length (c), wherein the chamfer (9) is arranged on the side facing away from the pawl (1) and directed toward the bottom side.

9. A method for producing the stacking column pawl (1) according to claim 1, comprising injection-molding a foam onto the stacking column pawl (1) to form the foam body (11).

* * * * *